No. 806,851. PATENTED DEC. 12, 1905.
F. STREICH.
DOUGH MOLDING MACHINE.
APPLICATION FILED JAN. 7, 1905.

2 SHEETS—SHEET 1.

WITNESSES
J. W. Angell
M. A. Milord

INVENTOR
Frank Streich
by Frederick Benjamin
Atty.

No. 806,851. PATENTED DEC. 12, 1905.
F. STREICH.
DOUGH MOLDING MACHINE.
APPLICATION FILED JAN. 7, 1905.
2 SHEETS—SHEET 2.
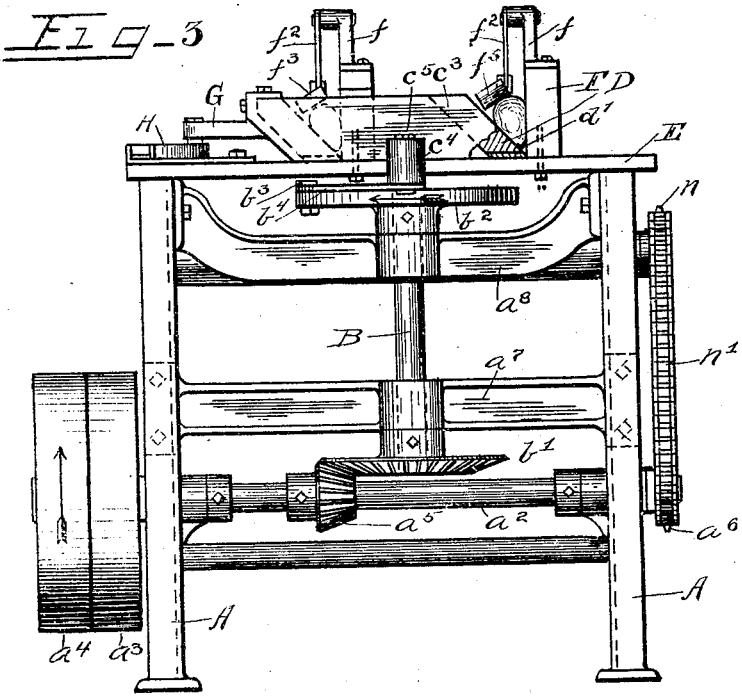
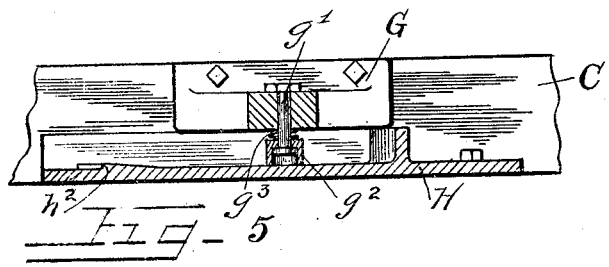
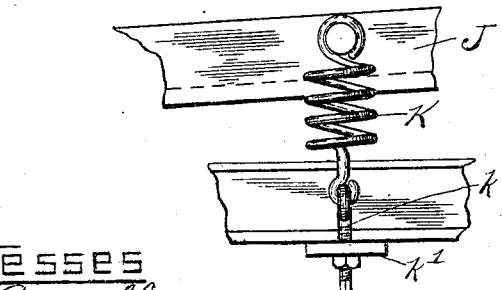
Witnesses
J. W. Angell
M. A. Melord
Inventor
Frank Streich
by Frederick Benjamin
Atty.

UNITED STATES PATENT OFFICE.

FRANK STREICH, OF CHICAGO, ILLINOIS, ASSIGNOR TO PHIL F. CARROLL, OF JOLIET, ILLINOIS.

DOUGH-MOLDING MACHINE.

No. 806,851.   Specification of Letters Patent.   Patented Dec. 12, 1905.

Application filed January 7, 1905. Serial No. 240,042.

*To all whom it may concern:*

Be it known that I, FRANK STREICH, a citizen of the United States, residing at Chicago, in the county of Cook and State of Illinois, have invented certain new and useful Improvements in Dough-Molding Machines, of which the following is a specification.

This invention relates to improvements in dough-molding machines; and the especial object of the improvements hereinafter described is to provide a machine of this class that will mold, knead, or work the lumps of dough and at the same time press them into uniform and symmetrical shape, with the outside skin or surface drawn so that it will present a smooth or unwrinkled appearance. Heretofore in machines of this type it has been possible to stretch the outer surface or skin of a lump of dough so as to give it a smooth appearance, and then when such stretching operation has been completed to press the lump into any desired shape by a separate operation. It has been found that a loaf of dough thus treated will not be of uniform texture throughout, the interior, by reason of not being affected by the stretching the skin or outer surface, being left with considerable quantities of gas, which in the baking causes large holes to form, while the outside portions near the crust are of close texture. The resulting bread is not satisfactory to the public, and hence it becomes important to provide a machine that will either knead or work the lump of dough before the skin is stretched, or that will knead and work it while the skin is being stretched, or that will perform the necessary working after the skin has been stretched and without interfering with or marring the smooth condition resulting from the stretching. It has been found that the best results are produced by performing the kneading operations simultaneously with the surface-stretching operations, and my invention has been therefore directed to providing a machine that will accomplish such results.

In the accompanying drawings I have illustrated a preferred application of my invention, but desire to be understood that various modifications may be made in the mechanical construction and arrangement of parts of same without departure from the essential principles of my invention.

Figure 1:
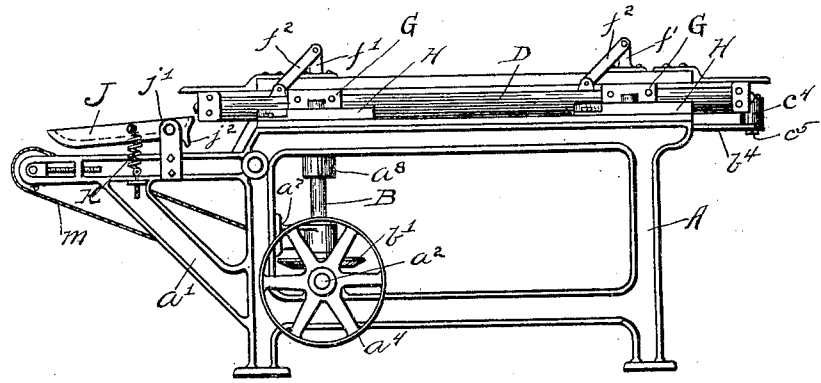
Figure 2:
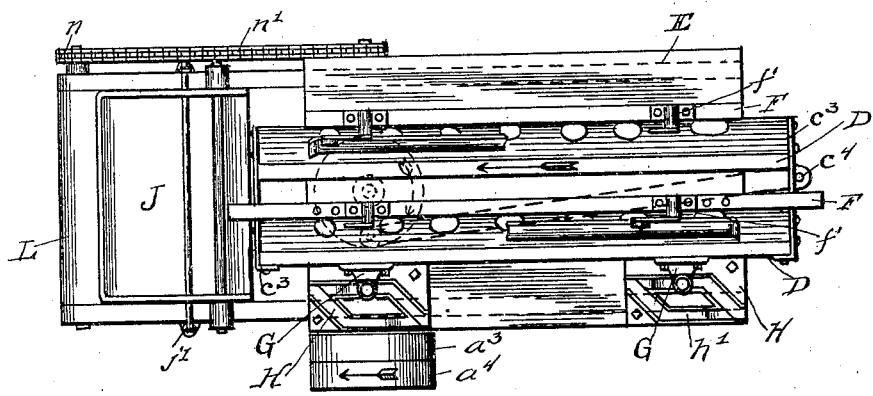

In said drawings, Figure 1 is a side elevation of a machine embodying my invention. Fig. 2 is a top plan view of same. Fig. 3 is a rear elevation on a somewhat larger scale. Fig. 4 is a fragmentary detail, partly in section, of a cam and its coöperating parts, which form important features of my invention; and Fig. 5 is a fragmentary detail of a tension device used in connection with the pressure-board, which also forms a part of my invention.

Referring to the drawings in detail, A represents a suitable supporting-frame for my dough-molding machine, which may be of any suitable size, shape, or material. This frame is provided with a table E and with an extension $a'$ at its front end, which furnishes a support for an endless apron and other parts to be described. Mounted in suitable bearings on the lower part of the frame A and near one end is a shaft $a^2$, upon which are mounted tight and loose pulleys $a^3$ $a^4$, respectively. There is also secured on said shaft a beveled pinion $a^5$, arranged about midway the sides of the frame A, and on the outer end of the shaft is a sprocket-wheel $a^6$.

Mounted in suitable bearings in the cross-pieces $a^7$ $a^8$ of the frame A is a vertical shaft B, on the lower end of which is a beveled wheel $b'$, which meshes with the pinion $a^5$. On the upper end of the shaft B is secured a horizontal disk $b^2$, near the periphery of which is a pin $b^3$, which forms a pivot for a pitman-rod $b^4$. The opposite end of this pitman-rod is loosely connected with the pin $c^5$, arranged in the bearing $c^4$, which is rigidly secured to the end piece $c^3$ of the vibrating frame C, to be described, so that the rotation of the disk $b^2$ will be communicated to the frame C, and thus produce a vibratory movement in the latter. This frame consists of end pieces $c^3$ and side pieces D D, which latter extend longitudinally of the table and are arranged with one side at an obtuse angle to the table and have secured in any suitable way to their lower edge a steel scraper $d'$, which rests upon and is in constant contact throughout its length with the upper surface of the molding-board.

Running longitudinally with the table E and rigidly secured thereto are two timbers F, the sides of which are at right angles to the table, as clearly shown in Fig. 3. Secured to the upper edges of these timbers are brackets $f'$, in the upper ends of which are pivoted links $f^2$, the lower ends of which are pivotally connected with wooden strips $f^3$, which are hung so that their lower faces are at an acute angle to both the pieces F and D. These strips are very light, so that they will exert but slight frictional contact with the pieces of dough upon which they rest.

Secured to one of the frame-pieces D are brackets G G, in which are formed bearings for a vertical pin $g'$, on the lower end of which is mounted a roller $g^2$, which is held under the tension of an expansion-spring $g^3$, which surrounds the pin $g'$ and bears against said roller and the bracket G, respectively, thus holding the said roller under a yielding tension. Secured to the table E are two cams H H, in which are formed grooves $h'$, which are in the shape of a parallelogram and are adapted to receive the rollers $g^2$, respectively. The bottoms of these cam-grooves are formed with a shoulder $h^2$ to prevent the possibility of the rollers being reversed in their travel through said grooves. The shape of the cam-grooves is such that as the rollers travel therethrough the frame C will be driven in two parallel planes, describing a parallelogram. The cams are so formed and the molding-pieces D are so set on the table E relative to the timbers F, that as the former move toward the latter the steel scrapers $d'$ will be brought up to the timbers F, as indicated in Fig. 3, and when they have reached this point they will be driven forward the length of the inner cam-groove, whereupon they will be moved outwardly away from the timbers and rearwardly parallel to said pieces until they reach the point in the groove where they will be driven forward, such motion being started by the rotation of the disk $b^2$, as heretofore described.

It will be apparent that a lump of dough thrown into the trough-shaped space between the pieces D and F will be squeezed or pressed by the movement of D toward F and that upon the forward or longitudinal movement of D said lump will be rotated on its vertical axis. When such lump has resting upon it the bar $f^3$, it will be held against the inner face of F until D returns for its second operation on the lump, thus advancing the lump along the face of F step by step until it reaches the end of the latter, when it will have been duly pressed into the symmetrical form indicated. It will also be apparent that the inclined working face of the piece D in pushing against the under side of the lump of dough necessarily results in stretching the skin of the latter, an operation that is promoted by the fact that the skin on the opposite side of the lump is held against the face of the piece F. It will also be apparent that as the lump is rotated on its vertical axis below the pressure-strips $f^3$ that the frictional contact with the latter will tend to smooth the skin at the top of the lump, and thus assist in the operation of freeing the outer surface of the lump from wrinkles.

Where it is desired to change the shape of the lump from the quasi-spherical or pear-shape form in which it will leave the trough formed by the pieces D and F to an elliptical or long loaf, I pass it under a pressure-board J, which is pivotally supported from standards $j'$, secured to the frame extension $a'$, and is in part supported and held under tension by an extension-spring K, which is secured at one end to the pressure-board J and at its other end to the frame extension. The pressure-board at its end adjacent to the main frame of the machine is formed with a downwardly-extending lug $j^2$, which extends the full width of the pressure-board J and is designed to catch the lump of dough as it falls onto the endless belt L, which is arranged under the pressure-board J and travels over suitable rollers in the frame extension $a'$ in any convenient manner. The belt is driven by a sprocket-wheel $n$, which in turn is driven by the sprocket-chain $n'$, which travels over the said sprocket-wheel and sprocket-wheel $a^6$, heretofore described. The tension of the spring K may be adjusted by screwing up the nut $k'$ on the eyebolt $k^2$. (Shown in Fig. 5.) If it is not desired to use the pressure-board J, it may be disconnected from the machine entirely, whereupon the lumps may be removed from the machine in the rounded form above described.

Having thus described my invention, what I claim as new, and desire to secure by Letters Patent, is—

1. In a dough-molding machine, a table, a timber secured at an angle to said table, a molding-board having its face set at an angle to said timber, and means for operating said molding-board whereby it will move toward, parallel to and away from said timber substantially in the manner described.

2. In a dough-molding machine, a table, a timber secured at right angles to said table, a molding-board having its face set at an acute angle to the face of said timber and means for operating said molding-board whereby it will move toward, parallel to and away from said timber substantially in the manner described.

3. In a dough-molding machine, a table, a timber secured at an angle to said table, a molding-board having its face set at an angle to said timber and having a scraper secured to its lower edge, means for operating said molding-board whereby it will move toward, parallel to and away from said timber in the manner described, and a strip supported above said molding-board and adapted to rest on the lumps of dough being operated on.

4. In a dough-molding machine, a table, a timber secured at right angles to said table, a molding-board having its face set at an acute angle to said timber and having a scraper secured to its lower edge, means for operating said molding-board substantially as described, and a strip pivotally supported above said molding-board and adapted to frictionally engage the lumps of dough being operated on.

5. In a dough-molding machine, a table, a fixed element secured to said table and having one face at at angle thereto, a molding-board adapted to move on the table and having its molding-face at an angle to said fixed element, and means for operating said molding element whereby it will alternately move toward and away from the fixed element, for the purpose described.

6. In a dough-molding machine, a table, a timber secured to said table, a molding-board having its face set at an acute angle to the face of said timber, means for operating said molding-board substantially as described, an endless apron adapted to receive the lumps of dough after leaving said molding-board, means for operating said apron and a pressure-board yieldingly mounted above said apron.

In testimony whereof I affix my signature in presence of two witnesses.

FRANK STREICH.

Witnesses:
 M. A. MILORD,
 F. BENJAMIN.